March 19, 1957  L. E. FISHER  2,786,152
CURRENT LIMITING BUSWAY
Filed Dec. 1, 1955
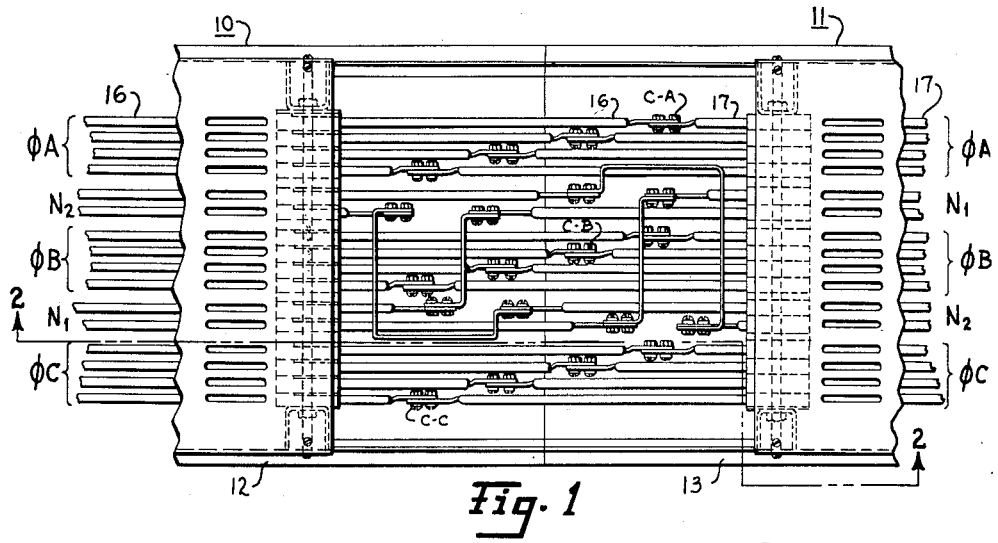
Fig. 1
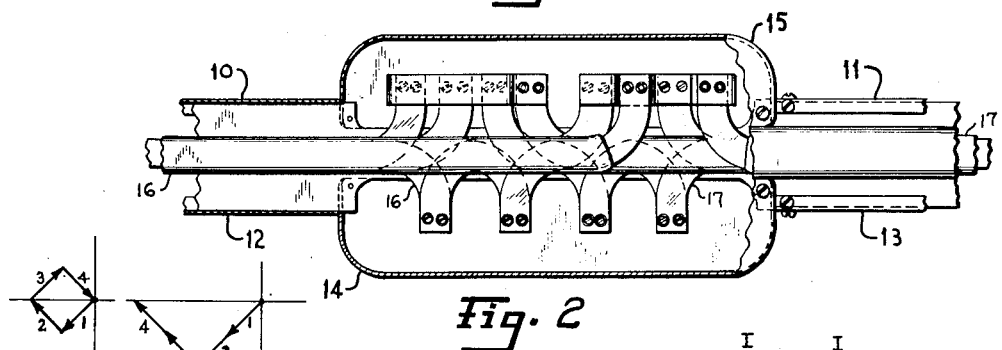
Fig. 2
Fig. 7a  Fig. 7b
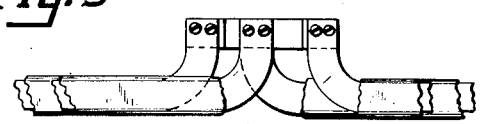
Fig. 3
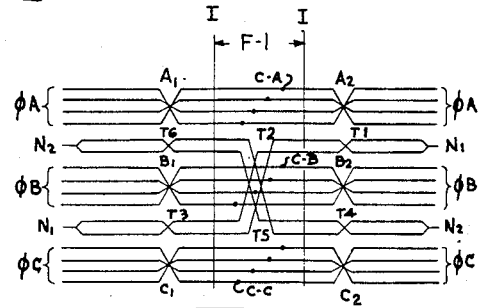
Fig. 5
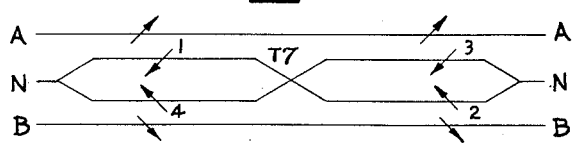
Fig. 4
Fig. 6
INVENTOR.
LAWRENCE E. FISHER
BY
ATTORNEY 2,786,152
Patented Mar. 19, 1957

United States Patent Office

2,786,152
CURRENT LIMITING BUSWAY

Lawrence Elbert Fisher, Southington, Conn., assignor to General Electric Company, a corporation of New York Application December 1, 1955, Serial No. 550,352

8 Claims. (Cl. 307—147)

My invention relates to electric power distribution systems of the busway type, and more particularly to busway systems capable of distributing multiphase and other out-of-phase power of unusually high currents, for example, of the order of 4000 amperes or more.

In my application Serial No. 459,979, filed October 4, 1954, and assigned to the same assignee as the present invention, there is disclosed a busway system having unusually high reactance, providing an inherent current-limiting action on the occurrence of short-circuit currents and including transposition of phase bus bars of a common phase to enforce equal intraphase current distribution despite the high reactance of the system.

It has been observed in tests of current-limiting busways made in accordance with my above application, that the reactance provided by such a system in limiting short-circuit currents, while much greater than that provided by conventional systems, is not as high as might be expected by computation taking into account the number, size, placement, etc., of the bus bars. I have discovered that in many cases this is due largely to the presence of neutral or ground conductors, which may have circulating currents induced therein by transformer action by the short-circuit current flowing in the adjacent phase conductors. The magnetic field associated with such circulating current in the neutral conductors in turn has an effect on the phase conductors which results in reducing the apparent reactance of such conductors, and hence the current-limiting ability of the system.

It is an object of the present invention to provide a current-limiting busway including phase conductors and neutral or ground conductors wherein induced circulating currents in the neutral conductors are reduced substantially to zero.

This is accomplished in accordance with my invention by providing a neutral conductor including a number of parallel sections, the various sections being interconnected by transposition connections in such a manner that the vector sum of the voltages induced therein, taken around a closed loop, is substantially zero.

My invention will be more fully understood by reference to the following specification taken in conjunction with the accompaying drawings and its scope will be pointed out in the appended claims. In the drawings:

Figure 1 is a top plan view of a portion of a current-limiting busway system embodying my invention and showing particularly the connected end portions of two adjacent lengths of such system, the schematic representation of such interconnection being as shown in the portion designated F-1 between the lines I—I of Figure 5;

Figure 2 is a side elevation view taken on the line 2—2 of Figure 1;

Figures 3 and 4 are a top plan view and a side elevation view respectively of a typical transposition connection between two adjacent neutral conductors such as represented schematically at T1, T3, T4 and T6 in Figure 5 showing the method of transposing two adjacent neutral conductors;

Figure 5 is a schematic representation of the electrical connections of a current-limiting busway feeder system incorporating my invention and adapted for use in a three-phase electrical system;

Figure 6 is a schematic drawing of a simplified circuit incorporating my invention, without intraphase transpositions and suitable for use in a two-phase system;

Figures 7A and 7B are schematic representations of the vectorial sum of voltages induced in the neutral conductors of a system such as that of Figure 6 with and without the transposition connection illustrated.

Referring to the drawings, I have shown my invention as embodied in an electric power distribution system or busway system comprising a plurality of interconnected elongated sections 10 and 11, each section comprising a suitable outer enclosure 12 and 13, containing a number of generally flat strap-like bus bars 16 and 17 respectively, arranged in close side-by-side alignment and having their respective ends bent edgewise and offset from the plane of the group of bus bars and bolted to corresponding bus bars of the other section, the connection point being shielded by suitable offset cover means such as by covers 14 and 15. The bus bars are adapted to be supported within the enclosures 12 and 13 by suitable insulating and supporting means (not shown) such, for instance, as disclosed in Patent #2,576,774, issued November 27, 1951, to E. T. Carlson and assigned to the same assignee as the present invention.

My invention is shown as incorporated in a busway suitable for use in a three-phase electrical distribution system and includes, in accordance with the teachings of my above application, a number of bars per phase arranged in groups, the phase groups being spaced relatively widely apart from each other, with the intraphase spacing of the bars being relatively small, and the bars within each phase group being transposed symmetrically. Specifically, there is shown in Figure 1 four bus bars designated phase A, four bars designated phase B, and four bars designated phase C. Each group of phase bars includes straight-length connections C—A, C—B and C—C. As illustrated in the schematic drawing, Figure 5, the members of each group of phase bars are also transposed as regards their position within each of the phase groups A, B, and C at two intermediate points, as at A1 and A2, B1 and B2, and C1 and C2. In accordance with the present invention, a neutral conductor is provided comprising two pairs of elongated sectional conductors designated as N1 and N2 in Figures 1 and 5, and having portions positioned between the phase groupings A and B and between the phase groupings B and C. It will be understood that the ends of the pairs of conductors N1 and N2 ordinarily would also be connected together or to a common neutral or grounding point at each end of the system, so that in effect the group of neutral bars constitutes a single neutral or grounded conductor extending along the length of the busway system.

As illustrated in Figure 5, the pair of neutral conductors N1 is transposed at three points along its length, at points T1, T2 and T3, and the pair N2 is similarly transposed at T4, T5 and T6. In addition, the pairs N1 and N2 are themselves transposed in position with respect to the phase groupings substantially at the midpoint of the run. Thus one half of the pair N1 is positioned between the phase groups A and B, and the other half between the phase groups B and C.

The operation of my invention can be understood by reference to the simplified schematic of Figure 6. If we assume a current flowing in conductor A, having a phase as indicated by the arrows marked thereon, and a current flowing in phase B as indicated by the arrows marked thereon (ordinarily 120° displaced from the current of phase A), it will be understood that voltages are induced in each adjacent neutral bar by the action of the current flowing in that phase group. The polarity of such induced voltage in such a neutral bar is always such as to tend to cause current flow in the neutral conductor in a direction opposite to that of the current flow in the phase group. The effect of such induced current flow is normally such as to reduce the effective reactance of a high reactance system. It will be observed that by means of the transposition connection indicated midway of the conductor N at T7, the voltages induced in approximately one half of the neutral bar are caused to cancel out the voltages induced in the other half of the neutral bar. Thus the effective vector sum of voltages around the closed loop is zero. This is illustrated diagrammatically in Figure 7A. In Figure 7B, on the other hand, there is shown the vector sum of such voltages as they would exist if the transposition T7 were omitted. The neutral conductor pairs illustrated in Figure 5 similarly include portions having voltages of differing phase relation induced therein in such a manner that such induced voltages always balance each other out to produce a vector sum which is substantially zero. In addition, the pairs N1 and N2 are themselves transposed in position as regards the phase groupings A, B and C whereby the vector sum of voltages taken around the entire loop including the common connections between the pairs N1 and N2 at each end of the system will also be zero regardless of inequality of currents in the various phases.

In addition to currents which flow in the neutral conductors due to induced voltages, high currents occasionally flow in such conductors by reason of unbalanced loading of the various phases and by reason of a short circuit or fault occurring between a given phase and ground (or neutral). In the case of such currents the present invention is also of considerable value for the following reasons. Without the transpositions indicated in the neutral conductors, current flowing in the neutral line because of a phase-to-ground short circuit is very unequally divided between the neutral conductors located between phases A and B on the one hand, and the neutral conductors located between phases B and C on the other. Thus in the case of a fault from phase A to ground, most of the short-circuit current would flow through the neutral conductors located between phases A and B, and a much lesser amount through the conductors located between phases B and C. This is because the greater proximity of the first conductors to the A phase causes this path to present a much lower effective reactance. Such unbalance causes the forces exerted on such bars to be very great, and increases the likelihood of mechanical failure.

By transposing each pair of neutral conductors so that on-half their length is between phases A and B, and the other half between phases B and C, such short-circuit current is caused to divide substantially equally between both sets of neutral conductors. This greatly reduces the magnitude of the current which either pair has to carry and the accompanying forces, and accordingly reduces the likelihood of failure.

While I have illustrated only two specific embodiments of my invention, it will be apparent that many other modifications thereof may be made by those skilled in the art, and I therefore intend by the appended claims to cover all such modifications as fall within the true spirit and scope of my invention.

What I claim as new and desire to secure by Letters Patent of the United States is:

1. An electric power distribution system comprising at least two conductors each for connection to a different phase of out-of-phase electric power sources and a neutral conductor positioned between said phase conductors and comprising a plurality of parallel electrically conductive bar sections, the said bar sections being transposed at least once along their length to reduce the vector sum of voltages induced in said bar sections.

2. Electric power distribution system apparatus comprising a plurality of parallel spaced bus bar conductors and including a pair of electrical conductors for connection each to a different phase of out-of-phase electric power sources and a neutral conductor positioned between said phase conductors and including a pair of elongated electrical bus bar conductors having their extreme ends connected electrically in common, one of said pair of neutral conductors lying closer to one of said phase bars and the other of said neutral conductors lying closer to the other of said phase bars, said neutral conductors being transposed at a point intermediate their ends to render the vector sum of voltages induced therein around a closed loop substantially zero.

3. Electric power distribution system apparatus comprising a plurality of electrical conductors each for connection to a different phase of out-of-phase electrical power sources, a neutral conductor comprising two electrically conductive elongated bar portions, one of said bar portions being closer to one of said phase conductors than to the other of said phase conductors and the other of said neutral conductors being closer to the other of said phase conductors than to the first phase conductor, and transposition connectors connecting equal intermediate portions of said pair of neutral conductors whereby the vectorial sum of voltages induced in said neutral conductors around a closed loop by a current flowing in said phase conductors is substantially zero.

4. Electric power distribution system apparatus comprising three groups of electrical conductors, each group for connection to a different one of three phase-displaced power sources, a neutral conductor comprising two pairs of generally parallel conductor portions, one pair of said conductor portions being positioned between a first and second one of said phase groups and the other pair of said conductors being positioned between the second and third of said phase groups, each of said pairs of parallel conductors being transposed substantially midway between its ends.

5. Electric power distribution apparatus comprising a first, second and third group of electrical conductors, each group for connection to a different one of three phase-displaced power sources, a neutral conductor comprising two pairs of generally parallel conductor portions, each of said pairs having its portions transposed at least once along its length and each of said pairs having a portion thereof positioned between said first and said second phase groups and having a substantially equal portion positioned between said second and said third phase groups.

6. Short-circuit current limiting power distribution apparatus comprising a plurality of parallel spaced bus bar conductors supported in groups of adjacent conductors each group for connection to a different phase of out-of-phase electric power sources with the interphase spacing of said conductors being greater than the intraphase spacing thereof, and a neutral conductor comprising a plurality of parallel spaced bus bar conductors positioned between two adjacent phase groups, said phase conductors having intraphase transpositions along their length and said neutral conductors including transposed longitudinal portions.

7. Short-circuit current limiting power distribution apparatus comprising a hollow elongated housing, a plurality of parallel spaced bus bar conductors supported within said housing in groups of adjacent conductors each group for connection to a different phase of out-of-phase electric power sources, the spacing between centrally located conductors of different adjacent groups being several times greater than the spacing between adjacent conductors within the same phase group thereby to provide relatively high reactance and at least one pair of conductors within each group having parallel portions in mutual transposed positions along their length and a plurality of neutral conductors positioned between adjacent phase groups and including transposed portions, the total length of the portions of each conductor in each transposition being substantially equal.

8. Current-limiting power distribution apparatus comprising a plurality of parallel spaced side-by-side bus bar conductors supported in groups of adjacent similar phase conductors with the spacing between adjacent conductors within each group substantially less than the spacing between central conductors of different adjacent groups, means connecting parallel portions of at least one pair of conductors within each group in mutual transposed relation along their length, a plurality of neutral conductors between each pair of adjacent phase groups, said neutral conductors including at least one pair of conductors having substantially equal portions in transposed relation along their length.

No references cited.